United States Patent
Aboualy et al.

(10) Patent No.: US 10,951,638 B2
(45) Date of Patent: Mar. 16, 2021

(54) SECURITY OF SERVER HOSTING REMOTE APPLICATION

(71) Applicant: INTERNATIONAL BUSINESS MACHINES CORPORATION, Armonk, NY (US)

(72) Inventors: Tamer Aboualy, Etobicoke (CA); Recep Meric Degirmenci, Istanbul (TR)

(73) Assignee: International Business Machines Corporation, Armonk, NY (US)

(*) Notice: Subject to any disclaimer, the term of this patent is extended or adjusted under 35 U.S.C. 154(b) by 130 days.

(21) Appl. No.: 16/019,719

(22) Filed: Jun. 27, 2018

(65) Prior Publication Data

US 2020/0007562 A1  Jan. 2, 2020

(51) Int. Cl.
*H04L 29/06* (2006.01)
*H04L 29/08* (2006.01)
*H04L 12/26* (2006.01)

(52) U.S. Cl.
CPC ........ *H04L 63/1425* (2013.01); *H04L 43/045* (2013.01); *H04L 43/06* (2013.01); *H04L 67/025* (2013.01); *H04L 67/22* (2013.01)

(58) Field of Classification Search
CPC . H04L 12/58; H04L 9/32; H04L 12/26; H04L 63/1425; H04L 43/045; H04L 43/06; H04L 67/025; H04L 67/22; H04L 63/20; H04L 67/10; H04L 63/1416; G06F 11/00; G06F 21/31; G06N 5/04; G06N 99/00;

(Continued)

(56) References Cited

U.S. PATENT DOCUMENTS 7,624,448 B2 * 11/2009 Coffman ............... G06F 21/552
                                                           726/22
8,762,298 B1     6/2014 Ranjan et al.
(Continued)

FOREIGN PATENT DOCUMENTS

CN      1758605 A     4/2006
CN    101639831 A     2/2010
CN    103916891 A     7/2014

OTHER PUBLICATIONS

International Search Report and Written Opinion of International application No. PCT/IB2019/055241 dated Oct. 12, 2019.
(Continued)

*Primary Examiner* — Thanhnga B Truong
(74) *Attorney, Agent, or Firm* — Rakesh Roy (57) ABSTRACT

A method, computer system, and a computer program product for detecting a malicious activity with respect to an application hosted on a server is provided. The present invention may include collecting user activity data associated an application accessed remotely over a network and generating a graph from the collected user activity data. Each node of the graph may represent a set of user requests received from a user with respect to a location within the application and each connection between nodes may represent a user navigable path between locations within the application. The present invention may include storing the generated graph and monitoring subsequent user activity with respect to the application. The present invention may include detecting a subsequent user activity that does not match the stored graph.

15 Claims, 6 Drawing Sheets

(58) Field of Classification Search
CPC ........ G06N 20/00; G06N 5/047; G06N 20/20; H04W 12/0023; H04W 12/12
See application file for complete search history.

(56) References Cited

U.S. PATENT DOCUMENTS

| | | |
|---|---|---|
| 9,021,566 B1 | 4/2015 | Panayotopoulos |
| 9,292,695 B1 | 3/2016 | Bassett |
| 9,317,670 B2 * | 4/2016 | Gudlavenkatasiva .. G06F 21/31 |
| 2015/0163121 A1 | 6/2015 | Mahaffey et al. |
| 2016/0261621 A1 | 9/2016 | Srivastava et al. |
| 2017/0063909 A1 | 3/2017 | Muddu et al. |
| 2019/0068627 A1 | 2/2019 | Thampy |
| 2020/0153855 A1 | 5/2020 | Kirti et al. |

OTHER PUBLICATIONS

Akoglu et al., "Graph Based Anomaly Detection and Description: A Survey," Data Mining and Knowledge Discovery, May 2015, p. 626-688, vol. 29, Issue 3, Springer.
Beutel et al., "Graph-Based User Behavior Modeling: From Prediction to Fraud Detection," KDD '15: Proceedings of the 21th ACM SIGKDD International Conference on Knowledge Discovery and Data Mining, 2015, p. 1-7.
Zachara, "Identification of Scanning and Attacks Against Web Applications with Graph-Based Modeling of Users' Behavior," 3rd IEEE International Conference on Cybernetics (CYBCONF), 2017, 8 Pages, IEEE.

* cited by examiner

SECURITY OF SERVER HOSTING REMOTE APPLICATION

BACKGROUND

The present invention relates generally to the field of computing, and more particularly to internet security.

Communications that are routed via the internet are vulnerable to being intercepted between an end-point and a server to exploit weaknesses behind an application logic of an application hosted on the server. As these vulnerabilities are related to the application logic, common vulnerability scanners and protection technologies are unable to detect such malicious activities.

SUMMARY

Embodiments of the present invention disclose a method, computer system, and a computer program product for detecting malicious activity with respect to an application hosted on a server. The present invention may include in a first aspect, a computer implemented method comprising collecting user activity data in relation to an application accessed remotely over a network, generating a graph from the collected user activity data, each node of the graph representing a set of user requests received from a user in respect of a location within the application and each connection between nodes representing a user navigable path between locations within the application, storing the generated graph, monitoring subsequent user activity with respect to the application, and detecting any user activity that does not match the stored graph.

According to a second aspect, the present invention may include a data processing system comprising a processor arranged to collect user activity data in relation to an application accessed remotely over a network, generate a graph from the collected user activity data, each node of the graph representing a set of user requests received from a user in respect of a location within the application and each connection between nodes representing a user navigable path between locations within the application, store the generated graph, monitor subsequent user activity with respect to the application, and detect any user activity that does not match the stored graph.

According to a third aspect, the present invention may include a computer program product for controlling a data processing system comprising a processor, the computer program product comprising a computer readable storage medium having program instructions embodied therewith, the program instructions executable by the processor to cause the processor to collect user activity data in relation to an application accessed remotely over a network, generate a graph from the collected user activity data, each node of the graph representing a set of user requests received from a user in respect of a location within the application and each connection between nodes representing a user navigable path between locations within the application, store the generated graph, monitor subsequent user activity with respect to the application, and detect any user activity that does not match the stored graph.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments. The following described exemplary embodiments provide a system, method and program product for detecting malicious activity with respect to an application hosted on a server.

Figure 1:
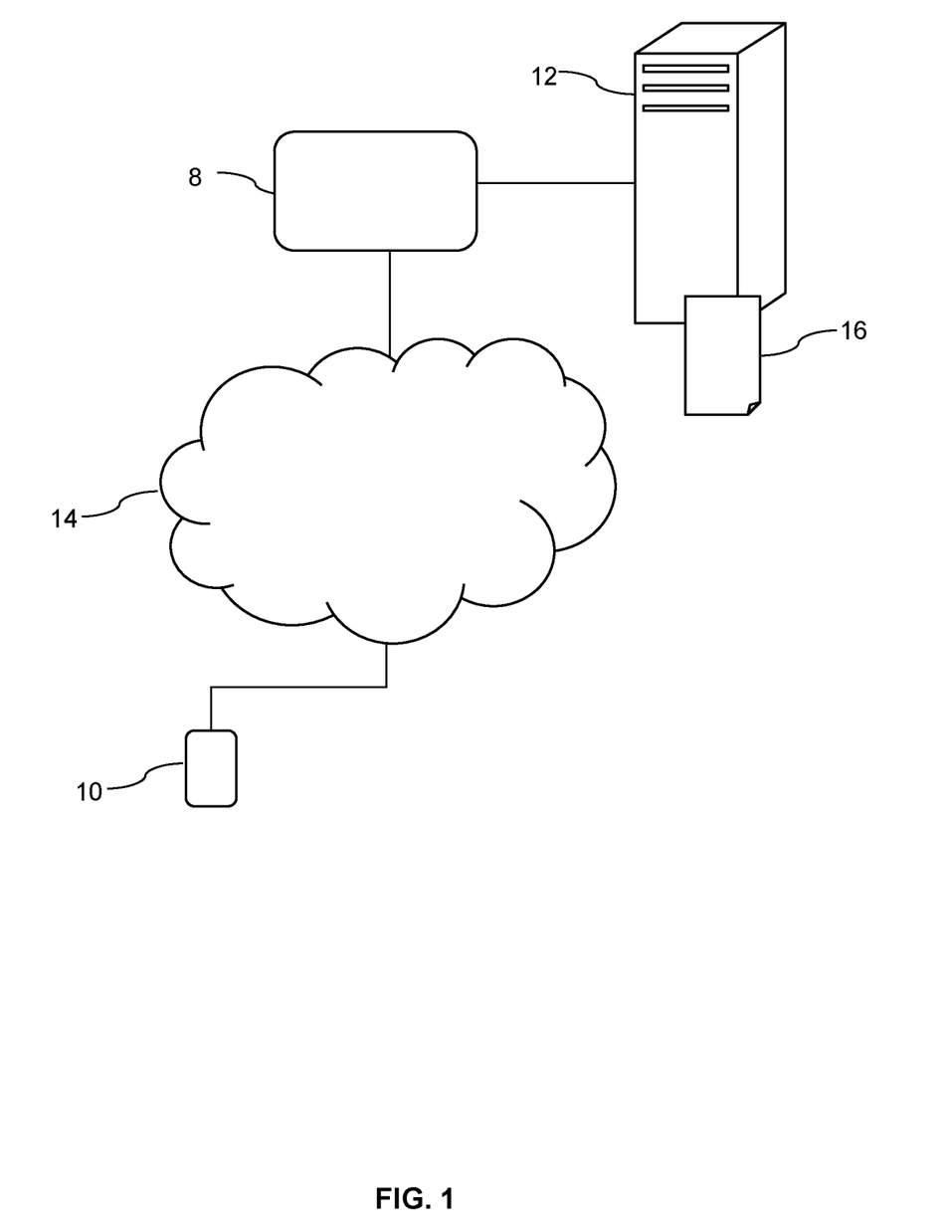
FIG. 1 illustrates a schematic diagram of a user device accessing an application over a networked computer environment according to at least one embodiment.

Referring to FIG. 1, an exemplary networked computer environment in accordance with one embodiment is depicted.

The networked computer environment may include a user device 10 that may connect to a remote server 12 over a network 14. Communication between the device 10 and the server 12 may pass through a security appliance 8. The appliance 8 may include a standalone device but may also be implemented as a software component that may be installed on the server 12. As illustrated in FIG. 1, in one embodiment, the user device 10 may include a mobile device (e.g., a smartphone) and the remote server 12 may run a mobile application 16 to which the user device 10 may connect via the network 14. The network 14 may include a wireless component, such as 4G, and a wired component, such as the internet. The user device 10 may connect to a 4G network and a 4G network provider may connect to the internet, allowing a user of the user device 10 to access the internet and applications delivered via the internet through the user device 10. Although the user device 10 may include a smartphone, any suitable connected device, such as a computer connected via a wired network, may access the application 16 on the server 12.

In one embodiment, the user device 10 may access a mobile application, such as the application 16, through an internet browser running on the user device 10. In another embodiment, the user device 10 may access the application 16 through a dedicated application installed on the user device 10, where the dedicated application may connect directly to the application 16. In the example illustrated in FIG. 1, the user may use the user's smartphone 10 to access a remote banking application 16, which may provide the user with various online banking services through the application 16 running on the user's smartphone 10. For example, the user may log into a user bank account through the application 16 running on the user's smartphone 10 and perform actions in relation to the user bank account, such as checking the current bank balance and performing bank transfers.

It may be appreciated that the secure delivery of the various services associated with the mobile application 16 to the user's smartphone 10 may be of high priority to the mobile application 16. The ability of the application 16 to perform, for example, bank transfers to and from a user bank account, may mean that such applications 16 may be the target for malicious and criminal activity. Many different techniques may be used to attempt to interfere with such applications 16. Communications that are routed via the internet may always be vulnerable to being intercepted and manipulated to change the content of the communications or used to form the basis for attacks on the application 16.

Figure 2:
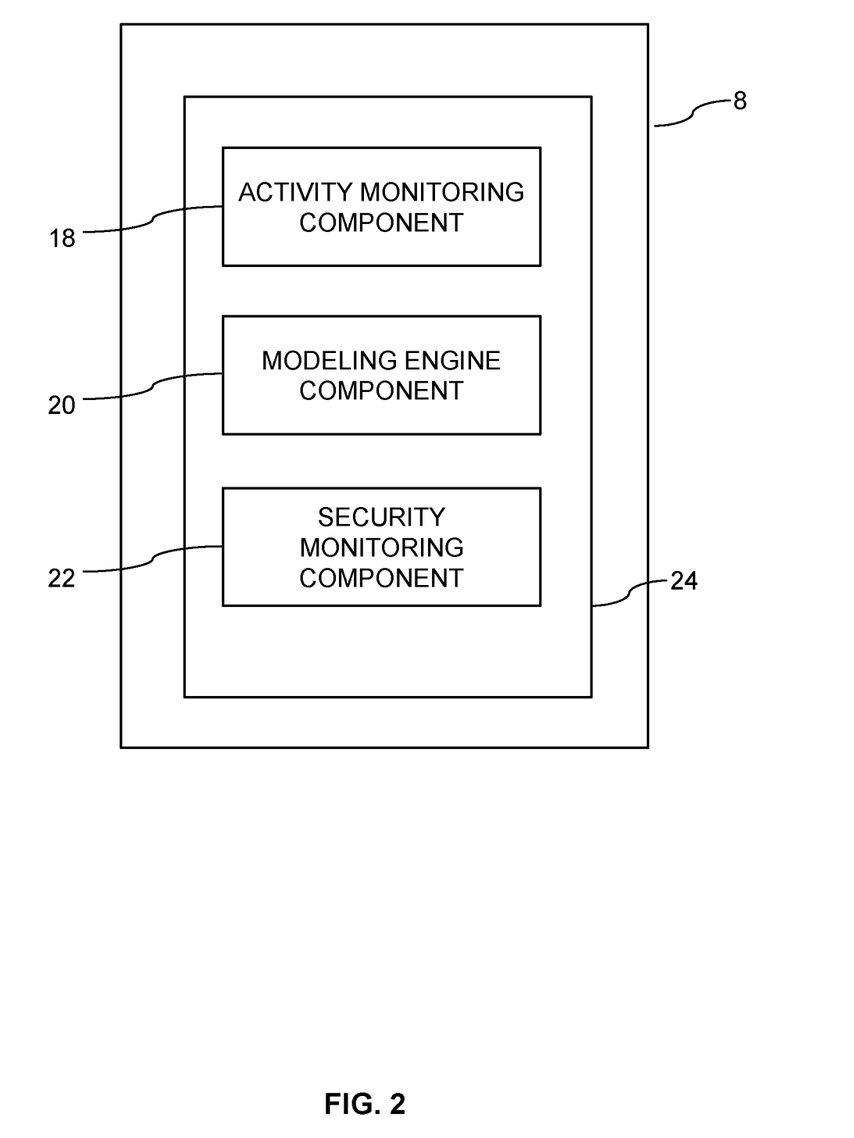
FIG. 2 is a schematic diagram illustrating components of an appliance depicted in FIG. 1 according to at least one embodiment.

Referring now to FIG. 2, a schematic diagram illustrating the components of the appliance 8 is shown, according to at least one embodiment.

In one embodiment, the appliance 8 may include three components: an activity monitoring component 18, a modeling engine component 20, and a security monitoring component 22. The three components may be run by a processor 24 of the appliance 8. The activity monitoring component 18, the modeling engine component 20, and the security monitoring component 22 are depicted in FIG. 2 as separate components for illustrative purposes and to explain the different functions. According to one embodiment, the three components may be implemented as part of one, or the same, overall software or hardware element that may deliver security functionality. The activity monitoring component 18, the modeling engine component 20, and the security monitoring component 22 may be designed to provide security for the application 16 and to detect and prevent malicious and criminal activity associated with the application 16.

According to one embodiment, the activity monitoring component 18 may collect user activity logs to provide data for a behavior modeling process. Then, the modeling engine component 20 may use the data collected by the activity monitoring component 18 to generate a graph that may model the user behavior. Next, the security monitoring component 22 may monitor subsequent user internet activity to detect if any user internet activity may be violating the generated model. The modeling engine component 20 may generate the user behavior model as a graph, where each node of the graph may correspond to activity with respect to a location within the application 16 and each connection between nodes may represent a user navigable path between locations within the application 16. In one embodiment, the location within the application 16 may be a state (e.g., a specific page) of the application 16.

As described previously, the three components (e.g., the activity monitoring component 18, the modeling engine component 20, and the security monitoring component 22) of the appliance 8 may be implemented to generate a graph that represents normal user behavior with respect to the application 16 and may then detect any user behavior that does not match the graph that has been generated. The graph may be built up from a dataset including a normalized version of cumulative interactions that users may have with the application 16 over a sufficiently long period of time, which may be harvested by the activity monitoring component 18. It is contemplated the weights of any malicious users of the application 16 in the harvested dataset may be negligible since the vast majority of users of the application 16 may be legitimate users.

The modeling engine component 20 may then generate the graph using the dataset harvested by the activity monitoring component 18. In at least one embodiment, neither the activity monitoring component 18 nor the modeling engine component 20 may interfere with the normal operation of the application 16. The activity monitoring component 18 and the modeling engine component 20 may be transparent to the application 16 which may perform normal operations, unaware of the two components 18 and 20.

According to one embodiment, the user using the user device 10 may browse through a web application or mobile application 16, where each time the user navigates a function, several requests may be sent almost simultaneously to the server 12 from the user device 10. Continuing with the previous example, when the user is using the smartphone 10 to make a payment through the online banking application 16, several requests, such as, a token verification request, images on the relevant page, stylesheets, and account balance information, may be sent to the application server 12. In one embodiment, the cluster of requests may be pseudo atomic requests. The activity monitoring component 18 may capture the pseudo atomic requests in relation to the current location of the user within the application 16.

Then, the modeling engine component 20 may analyze the user traffic using harvested historic data and may model the user behavior as a graph-based data structure. Once the user traffic is modeled, the security monitoring component 22 may monitor and analyze subsequent user traffic against the generated model.

Figure 3:
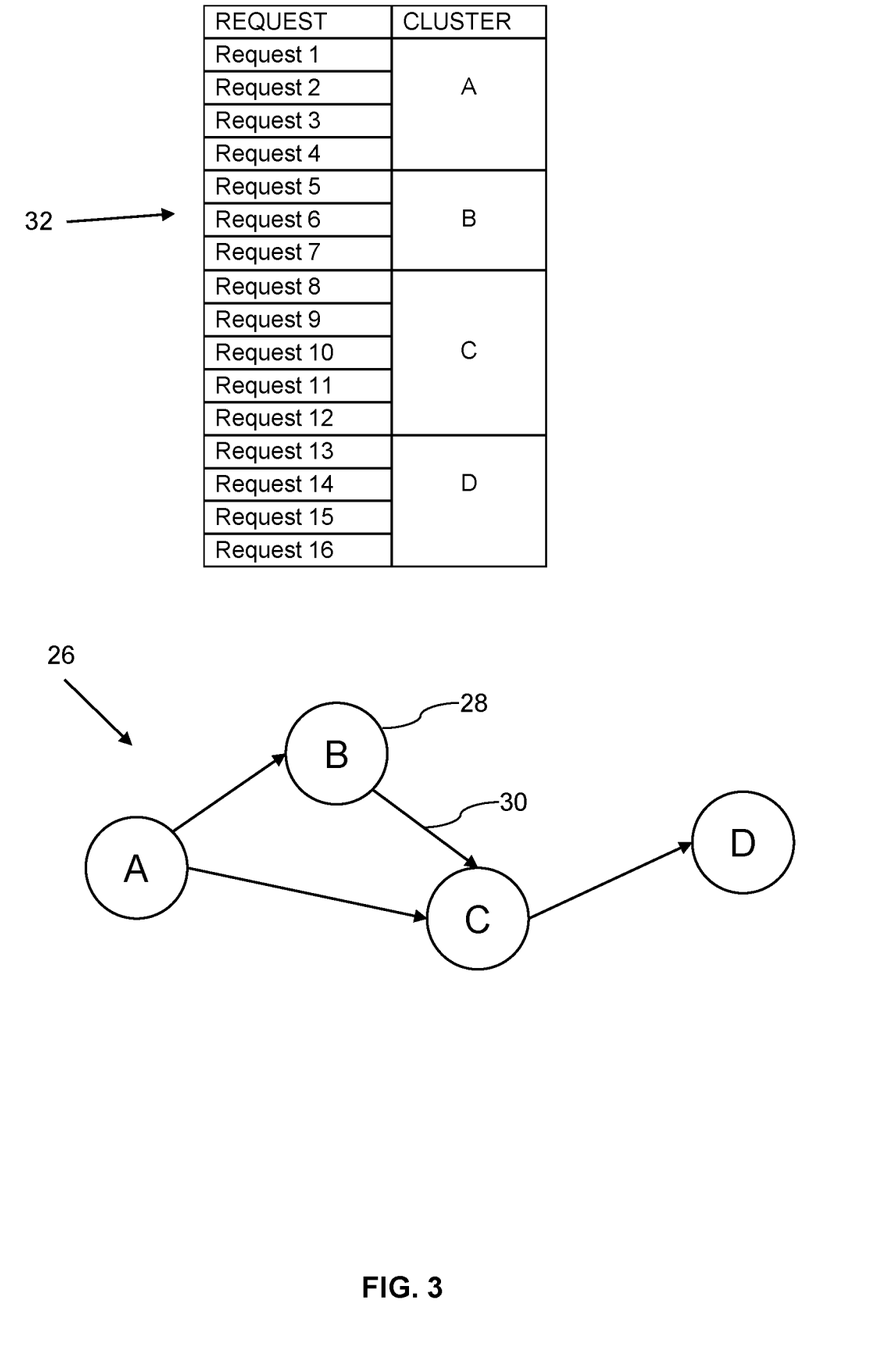
FIG. 3 is a schematic diagram illustrating a graph of nodes and connections according to at least one embodiment.

Referring now to FIG. 3, a schematic diagram illustrating an example of a graph 26 is shown, according to at least one embodiment.

In one embodiment, the graph 26 may include one or more nodes 28 and one or more connections 30. Each connection 30 may connect two nodes 28 and may be a unidirectional connection or a bidirectional connection. In FIG. 3, one visual representation of the graph 26 is depicted. However, the data underlying the graph 26 may be represented in many various other ways. FIG. 3 also illustrates a table 32 depicting the various requests that may be clustered together. Although the graph 26 shown in FIG. 3 only includes four nodes 28, in one embodiment, the graph 26 may include any number of nodes 28 and connections 30 associated with the application 16.

Continuing with the previous example, in relation to the online banking application 16, node A may represent a home page of the application 16, node B may represent a "current balance" function, and node C may represent a "transfer money" function. As such, the structure of the graph 26 shown in FIG. 3 may indicate that after the home page (e.g., node A), the user may navigate either directly to the "transfer money" page (e.g., node C) or may first navigate to the "current balance" page (e.g., node B). The connections 30 may represent the navigation options available to the user when navigating the application 16.

Figure 4:
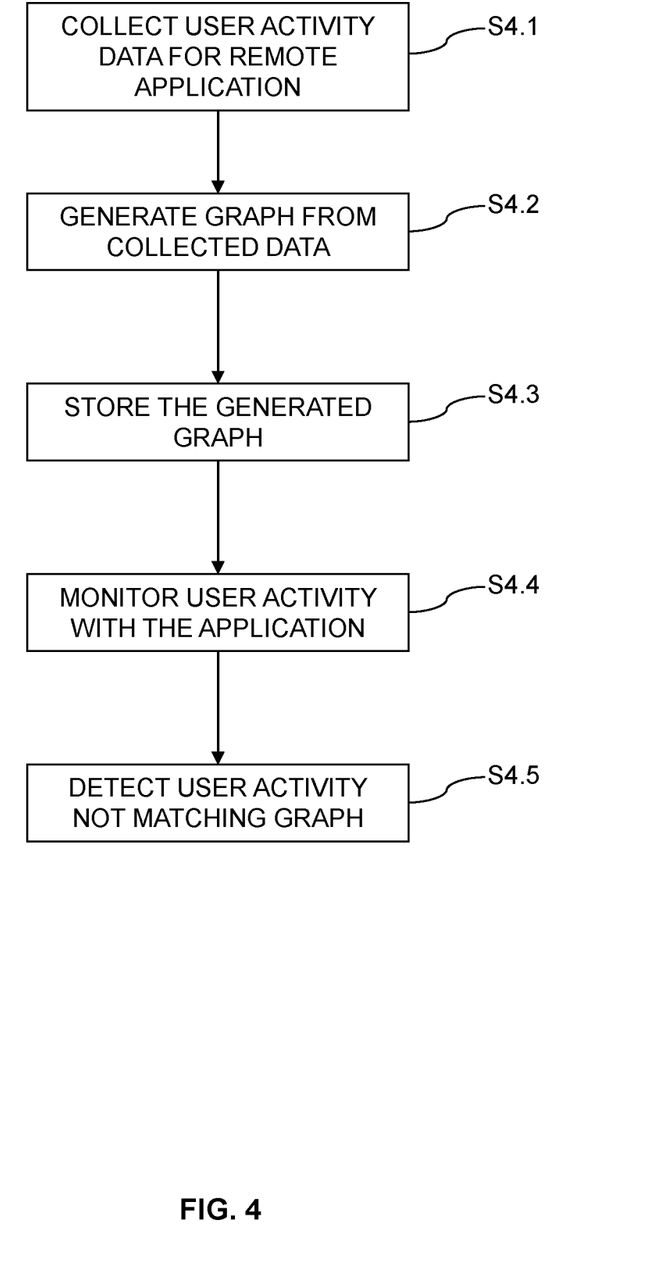
FIG. 4 is an operational flowchart illustrating a process for performing a security check on interactions with an application according to at least one embodiment.

Referring now to FIG. 4, an operational flowchart illustrating the exemplary computer implemented method of performing a security check on interactions with an application 16 is depicted, according to at least one embodiment.

At step S4.1, user activity data in relation to a remote application is collected. The activity monitoring component 18 may collect or harvest user activity data in relation to the application 16 accessed remotely over the network 14. In one embodiment, the activity monitoring component 18 may harvest the user interactions with the application 16 over a defined period of time (e.g., 24 hours). The harvested data may include user activity logs which may contain the requests that are made from the user device 10 to the server 12 hosting the application 16.

Then, at step S4.2, a graph is generated from the collected data. The modeling engine component 20 may generate a graph 26 (see FIG. 3) from the collected user activity data. Each node 28 (see FIG. 3) of the graph 26 may represent a set of user requests received from the user device 10 in relation to a location within the application 16. Additionally, each connection 30 (see FIG. 3) between nodes 28 of the graph 26 may represent a user navigable path between locations within the application 16. In one embodiment, the modeling engine component 20 may cluster the set of user requests received from the user device 10 (as a result of user interactions with the application 16) into pseudo atomic requests and may then generate a node 28 for each such cluster of pseudo atomic requests.

Next, at step S4.3, the generated graph is stored. The processor 24 of the appliance 8, which may perform the security check on interactions with the application 16, may store the generated graph 26 locally, so that the generated graph 26 may be continually accessed as/when needed. According to one embodiment, the generated graph 26 may be stored locally within the appliance 8.

Then, at step S4.4, user activity is monitored within the application. The security monitoring component 22 may monitor subsequent user activity with respect to the application 16. In one embodiment, the security monitoring component 22 may continuously monitor user activities associated with the application 16 as the application 16 continues to be used and accessed by incoming requests to the server 12 hosting the application 16.

Next, at step S4.5, user activity that does not match the graph is detected. The security monitoring component 22 (see FIG. 2) may detect any user activity that does not match the stored graph 26 (see FIG. 3). According to one embodiment, the security monitoring component 22 may detect user activities including, for example, requests of a cluster that may not sent to the server 12 simultaneously, requests from different clusters that may be sent to the server 12 simultaneously, and any unusual navigation path that may be discovered in the graph 26. In response to detecting any malicious activities, the security monitoring component 22 may generate an alert and may pause the detected requests to the application 16. In another embodiment, the security monitoring component 22 may trigger an alert for monitoring purposes. When malicious activities are detected, the normal operation of the application 16 may be stopped and the security of the application 16 may be improved.

Continuing with the previous example, a user activity may be detected when a received set of user requests does not match any node 28 (see FIG. 3) of the generated graph 26 (see FIG. 3). Specifically, the user requests that may form a pseudo atomic request may not match the requests that may form any of the clusters that may be defined by the nodes 28. This may indicate a malicious attempt to access the application 16 and therefore, the requests may be declined. In one embodiment, all normal received requests may match the requests of a node 28 in the graph 26. Thus, any tampering with normal user requests or the creation of fake user requests may be detected.

According to one embodiment, user activity may be detected if the user activity corresponds to navigation between two nodes 28 that are not directly connected by connections 30. In the application 16, the potential number of connections 30 between nodes 28 may be extremely large, however, most nodes 28 may only be connected to a small number of other nodes 28. As such, if the user activity indicates navigation between locations in the application 16 that are not connected on the graph 26, the user activity may trigger an alarm.

Once an alarm has been triggered, the security method may act automatically, for example, by stopping the application 16 from responding to the suspicious activity, suspending access to the user account, and generating an e-mail alert to an administrator of the application 16. In all other respects, the application 16 may continue to operate normally and the various components of the security process may continue to perform the respective component tasks. The security monitoring component 22 may continue to monitor all user activity with respect to the application 16.

Figure 5:
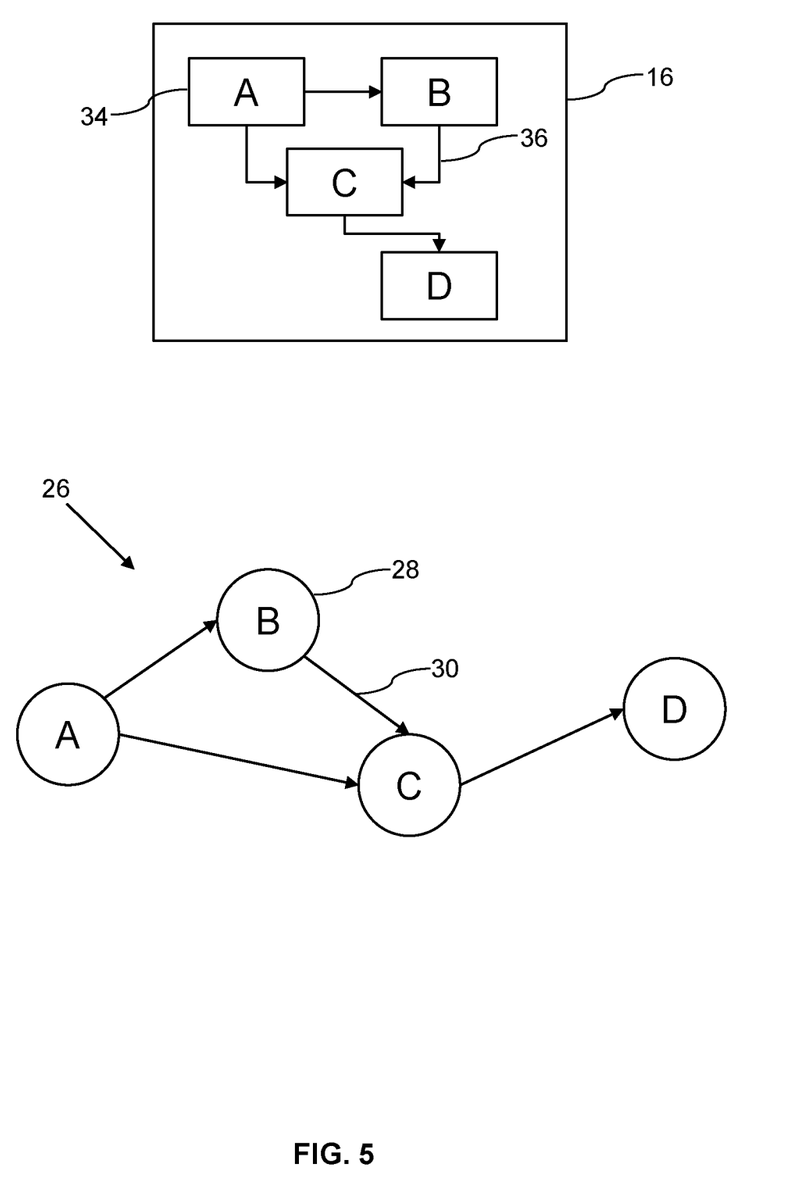
FIG. 5 is a schematic diagram illustrating an application and a graph according to at least one embodiment.

Referring now to FIG. 5, a schematic diagram illustrating the application 16, including locations 34 therein, is depicted according to at least one embodiment.

The locations 34 may include logical locations within the application 16 where a user may be presented with an output on the user device 10 and/or can perform one or more specific actions using the user device 10. For example, the landing or home page of a web application 16 may be a first location 34 within the application 16.

The application 16 may also include navigable routes 36 within the application 16, which may represent paths that the user may travel down (e.g., in the logical sense) while navigating the application 16. For example, if the user chooses to access the "current balance" page from the home page, the user may have to navigate to a new location 34 within the application 16. The modeling engine component 20 may generate the graph 26, including the nodes 28 and the connections 30, which may correspond to the locations 34 and the routes 36 of the application 16. The modeling engine component 20 may operate based on the output of the activity monitoring component 18 and may not have direct access to the application 16. As such, the modeling engine component 20 may not access the application logic of the application 16 in the process of generating the graph 26.

In one embodiment, the modeling engine component 20 may determine a weighted average of user activity for each location 34 within the application 16 and generate a node 28 in the graph 26 for the specific location 34 from the weighted average of user activity. The modeling engine component 20 may determine a weighted average of user activity in relation to the user activity with respect to a specific location 34 (and corresponding node 28). It is contemplated that the vast majority of users of the application 16 may be legitimate users and thus, the weight of malicious users in the dataset may be negligible. As such, malicious user behavior may not be codified into the graph 26, which may represent the normal actions of normal users in relation to the application 16. The graph 26 may contain multiple nodes 28 that may represent the normal user activity for a location 34 within the application 16.

According to one embodiment, the modeling engine component 20 may remove, from the collected user activity data, any data requests that may be generated independently of a user interaction with the application 16. In this way, the modeling engine component 20 may filter out common requests that may be sent to the server 12 independently of the user activity. The modeling engine component 20 may provide that the graph 26 may only codify pseudo atomic requests generated as a result of direct user interaction with the application 16. Any background activity that may occur between the user device 10 and the application 16 on the server 12 that is not a result of direct user action may not be included within the graph 26.

Figure 6:
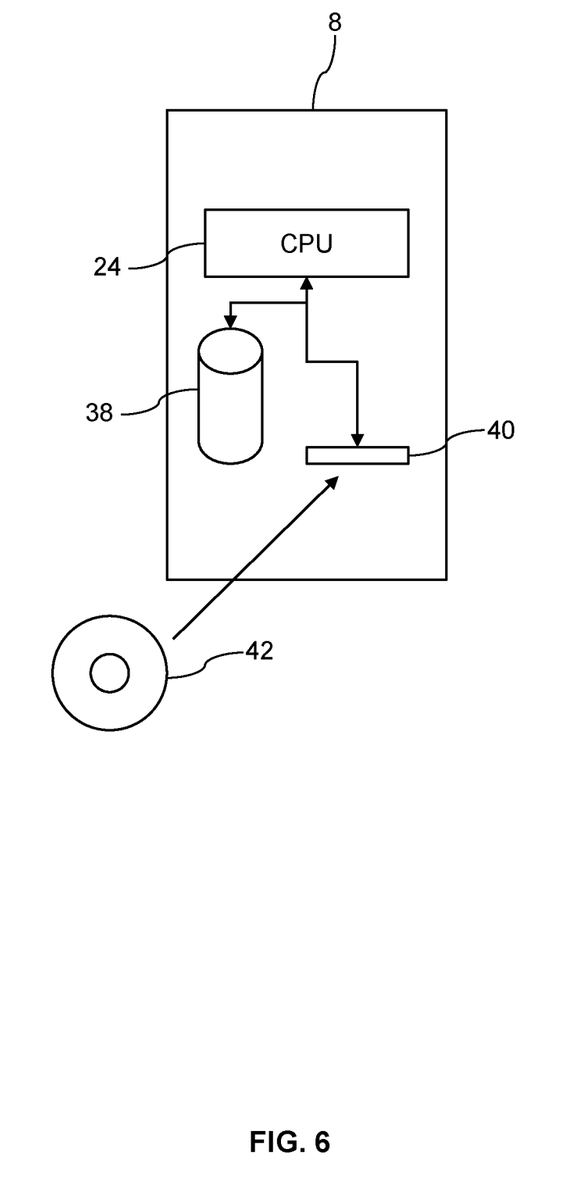
FIG. 6 is a schematic diagram illustrating the appliance depicted in FIG. 2, in accordance with an embodiment of the present disclosure.

Referring now to FIG. 6, a schematic diagram illustrating the appliance 8, including a data processing system, is depicted in accordance with an embodiment of the present disclosure.

The appliance 8 may include the processor 24 configured to control the operation of the appliance 8. The processor 24 of the appliance 8 may be connected to a local storage device 38 (e.g., for storing the generated graph 26) and to a local interface 40. A computer readable storage medium ("CD-ROM") 42 may be provided for storing a computer program product that may be used to control the processor 24 to operate the appliance 8. The processor 24 may execute instructions from the computer program product to operate the appliance 8. The processor 24, with the modeling engine component 20 (see FIG. 2), may generate the graph 26. The processor 24 may then store the generated graph 26 in the local storage device 38.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for detecting a malicious activity with respect to an application hosted on a server, the method comprising:
    collecting user activity data associated with an application accessed remotely over a network, wherein the collected user activity data includes at least one set of user requests received from a user, each set of the at least one received set of user requests is associated with a corresponding location within the application;
    generating a graph from the collected user activity data, the generated graph including a plurality of nodes and a plurality of connections linking the plurality of nodes, wherein each node of the plurality of nodes represents a corresponding set of the at least one received set of user requests and each connection of the plurality of connections represents a user navigable path between a pair of corresponding locations within the application;
    storing the generated graph;
    monitoring a subsequent user activity associated with the application accessed remotely over the network; and
    detecting that the subsequent user activity does not match the stored graph of the collected user activity data.

2. The method of claim 1, wherein detecting that the subsequent user activity does not match the stored graph further comprises detecting that a subsequent received set of user requests do not match any node of the plurality of nodes of the stored graph.

3. The method of claim 1, wherein detecting that the subsequent user activity does not match the stored graph further comprises detecting a subsequent user activity corresponding to navigation between a pair of nodes of the plurality of nodes that are not linked by one of the plurality of connections.

4. The method of claim 1, further comprising:
    determining a weighted average of user activity for each corresponding location within the application; and
    generating a corresponding node of the plurality of nodes for each corresponding location from the weighted average of user activity.

5. The method of claim 1, further comprising removing from the collected user activity data, a data request that is generated independently of a user interaction with the application.

6. A computer system for detecting a malicious activity with respect to an application hosted on a server, comprising:
    one or more processors, one or more computer-readable memories, one or more computer-readable tangible storage media, and program instructions stored on at least one of the one or more computer-readable tangible storage media for execution by at least one of the one or more processors via at least one of the one or more memories, wherein the computer system is capable of performing a method comprising:
        collecting user activity data associated with an application accessed remotely over a network, wherein the collected user activity data includes at least one set of user requests received from a user, each set of the at least one received set of user requests is associated with a corresponding location within the application;
        generating a graph from the collected user activity data, the generated graph including a plurality of nodes and a plurality of connections linking the plurality of nodes, wherein each node of the plurality of nodes represents a corresponding set of the at least one received set of user requests and each connection of the plurality of connections represents a user navigable path between a pair of corresponding locations within the application;
        storing the generated graph;
        monitoring a subsequent user activity associated with the application accessed remotely over the network; and
        detecting that the subsequent user activity does not match the stored graph of the collected user activity data.

7. The computer system of claim 6, wherein detecting that the subsequent user activity does not match the stored graph further comprises detecting that a subsequent received set of user requests do not match any node of the plurality of nodes of the stored graph.

8. The computer system of claim 6, wherein detecting that the subsequent user activity does not match the stored graph further comprises detecting a subsequent user activity corresponding to navigation between a pair of nodes of the plurality of nodes that are not linked by one of the plurality of connections.

9. The computer system of claim 6, further comprising:
    determining a weighted average of user activity for each corresponding location within the application; and
    generating a corresponding node of the plurality of nodes for each corresponding location from the weighted average of user activity.

10. The computer system of claim 6, further comprising removing from the collected user activity data, a data request that is generated independently of a user interaction with the application.

11. A computer program product for detecting a malicious activity with respect to an application hosted on a server, comprising:

one or more computer-readable tangible storage media and program instructions stored on at least one of the one or more computer-readable tangible storage media, the program instructions executable by a processor to cause the processor to perform a method comprising:

collecting user activity data associated with an application accessed remotely over a network, wherein the collected user activity data includes at least one set of user requests received from a user, each set of the at least one received set of user requests is associated with a corresponding location within the application;

generating a graph from the collected user activity data, the generated graph including a plurality of nodes and a plurality of connections linking the plurality of nodes, wherein each node of the plurality of nodes represents a corresponding set of the at least one received set of user requests and each connection of the plurality of connections represents a user navigable path between a pair of corresponding locations within the application;

storing the generated graph;

monitoring a subsequent user activity associated with the application accessed remotely over the network; and detecting that the subsequent user activity does not match the stored graph of the collected user activity data.

12. The computer program product of claim 11, wherein detecting that the subsequent user activity does not match the stored graph further comprises detecting that a subsequent received set of user requests do not match any node of the plurality of nodes of the stored graph.

13. The computer program product of claim 11, wherein detecting that the subsequent user activity does not match the stored graph further comprises detecting a subsequent user activity corresponding to navigation between a pair of nodes of the plurality of nodes that are not linked by one of the plurality of connections.

14. The computer program product of claim 11, further comprising:

determining a weighted average of user activity for each corresponding location within the application; and generating a corresponding node of the plurality of nodes for each corresponding location from the weighted average of user activity.

15. The computer program product of claim 11, further comprising removing from the collected user activity data, a data request that is generated independently of a user interaction with the application.

* * * * *